United States Patent
Reichert

(10) Patent No.: US 12,265,011 B2
(45) Date of Patent: Apr. 1, 2025

(54) METHOD FOR DETERMINING A PHYSICAL PROPERTY RELATED TO A CHARGE OF A CONSTITUENT OF A SAMPLE, FROM FIELD FLOW FRACTIONATION MEASUREMENTS WITH AN ADDITIONAL ELECTRICAL FIELD, AND APPARATUS THEREFOR

(71) Applicant: Postnova Analytics GmbH, Landsberg (DE)

(72) Inventor: Horst Reichert, Buchloe (DE)

(73) Assignee: Postnova Analytics GmbH, Landsberg (DE)

( * ) Notice: Subject to any disclaimer, the term of this patent is extended or adjusted under 35 U.S.C. 154(b) by 198 days.

(21) Appl. No.: 18/154,195

(22) Filed: Jan. 13, 2023

(65) Prior Publication Data
US 2024/0241027 A1 Jul. 18, 2024

(51) Int. Cl.
*G01N 15/1031* (2024.01)
*G01N 15/10* (2024.01)
*G01R 15/22* (2006.01)

(52) U.S. Cl.
CPC . *G01N 15/1031* (2013.01); *G01N 2015/1024* (2024.01)

(58) Field of Classification Search
CPC ........... G01N 15/1031; G01N 15/0266; G01N 15/0656
See application file for complete search history.

(56) References Cited

U.S. PATENT DOCUMENTS

| 5,133,844 A * | 7/1992 | Stevens | B03B 5/00 |
| | | | 204/549 |
| 2003/0019817 A1* | 1/2003 | Thomas | G01N 27/44773 |
| | | | 210/243 |

(Continued)

OTHER PUBLICATIONS

J. Calvin Giddings, "Field-Flow Fractionation: Analysis of Macromolecular, Colloidal, and Particulate Materials," Science, Jun. 4, 1993, pp. 1456-1465, vol. 260, Issue 5113.

(Continued)

*Primary Examiner* — Jermele M Hollington
*Assistant Examiner* — Temilade S Rhodes-Vivour
(74) *Attorney, Agent, or Firm* — Hodgson Russ LLP

(57) ABSTRACT

A method for determining a physical property related to a charge of a constituent of a sample, from field flow fractionation measurements with an additional electrical field, comprising the steps of obtaining a first fractogram of a first sample and a second fractogram of a second sample, wherein the first sample and the second sample are samples of a same substance, the first fractogram has been generated using a first electrical field, the second fractogram has been generated using a second electrical field, and a strength of the first electrical field and a strength of the second electrical field are different from each other; determining, by using a first mapping, from a first intensity value of the first fractogram, a first value and determining, by using a second mapping, from a second intensity value of the second fractogram, a second value; and determining, based on the first value and the second value, a physical property related to a charge of a constituent of at least one of the first sample and the second sample; wherein the first mapping maps the first intensity value to the first value of a first bijective function over time and the second mapping maps the second intensity value to the second value of a second bijective function over time.

12 Claims, 11 Drawing Sheets

(56) References Cited

U.S. PATENT DOCUMENTS

| | | | | |
|---|---|---|---|---|
| 2003/0119057 A1* | 6/2003 | Gascoyne | ............... | B82Y 30/00 435/7.1 |
| 2004/0000519 A1* | 1/2004 | Jiang | .................. | G01N 30/0005 210/656 |
| 2013/0100433 A1* | 4/2013 | Frose | ...................... | G01N 30/74 356/343 |
| 2022/0074927 A1* | 3/2022 | Leeman | ................ | G01N 1/4077 |

OTHER PUBLICATIONS

Karl-Gustav Wahlund, "Properties of an Asymmetrical Flow Field-Flow Fractionation Channel Having One Permeable Wall," Analytical Chemistry, May 1, 1987, pp. 1332-1339, vol. 59, No. 9, American Chemical Society.

Catia Contado, "Field flow fractionation techniques to explore the "nano-world"," Analytical and Bioanalytial Chemistry, Jan. 23, 2017, pp. 2501-2518, vol. 409.

R. Drexel et al., "Fast and Purification-Free Characterization of Bio-Nanoparticles in Biological Media by Electrical Asymmetrical Flow Field-Flow Fractionation Hyphenated with Multi-Angle Light Scattering and Nanoparticle Tracking Analysis Detection," Molecules, Oct. 1, 2020, vol. 25, No. 20: 4703, 19 pages.

R. Mildner et al., "Improved multidetector asymmetrical-flow field-flow fractionation method for particle sizing and concentration measurements of lipid-based nanocarriers for RNA delivery," European Journal of Pharmaceutics and Biopharmaceutics, Mar. 18, 2021, pp. 252-265, vol. 163.

Dorota Bartczak et al., "Determination of Size—and Number-Based Concentration of Silica Nanoparticles in a Complex Biological Matrix by Online Techniques," Analytical Chemistry, 2015, pp. 5482-5485, vol. 87, American Chemical Society Publications.

Yuchen Fan et al., "Analytical characterization of liposomes and other lipid nanoparticles for drug delivery," Journal of Pharmaceutical and Biomedical Analysis, Jan. 5, 2021, vol. 192, 21 pages.

Manuel J. Carrasco et al., "Ionization and structural properties of mRNA lipid nanoparticles influence expression in intramuscular and intravascular administration," Communications Biology, Aug. 11, 2021, vol. 4, 1956, 32 pages.

Linde Schoenmaker et al., "mRNA-lipid nanoparticle COVID-19 vaccines: Structure and stability," International Journal of Pharmaceutics, 2021, vol. 601, 14 pages.

Christoph Johann, "Instrument and Method to Determine the Electrophoretic Mobility of Nanoparticles and Proteins by Combining Electrical and Flow Field-Flow Fractionation," Analytical Chemistry, 2015, pp. 4292-4298, vol. 87, No. 8, American Chemical Society Publications.

Anne Litzen, "Zone Broadening and Dilution in Rectangular and Trapezoidal Asymmetrical Flow Field-Flow Fractionation Channels," Analytical Chemistry, May 15, 1991, pp. 1001-1007, vol. 63, No. 10, American Chemical Society Publications.

Albert Einstein, "On the Motion of Small Particles Suspended in Liquids at Rest Required by the Molecular-Kinetic Theory of Heat," Annalen der Physik, 1905, pp. 549-560, vol. 17.

Karl-Gustav Wahlund et al., "Properties of an Asymmetrical Flow Field-Flow Fractionation Channel Having One Permeable Wall," Analytical Chemistry, May 1, 1987, pp. 1332-1339, vol. 59, No. 9, American Chemical Society Publications.

Richard Wyndham O'Brien et al., "The electrophoretic mobility of large colloidal particles," Canadian Journal of Chemistry, 1981, pp. 1878-1887, vol. 59.

James W. Swan et al., "A simpler expression for Henry's function describing the electrophoretic mobility of spherical colloids," Journal of Colloid and Interface Science, Aug. 28, 2012, pp. 92-94, vol. 388.

M. Von Smoluchowski, "Zur kinetischen Theorie der Brownschen Molekularbewegung und der Suspensionen," Ann. Phys. 1906, 756-780, vol. 326. No English translation available.

Jaeyeong Choi, "Separation and zeta-potential determination of proteins and their oligomers using electrical asymmetrical flow field-flow fractionation (EAF4)," Journal of Chromatography A, 2020, vol. 1633, 8 pages.

Postnova, "Electrical asymmetrical flow field-flow fractionation analysis of the NIST monoclonal antibody reference material 8671," Postnova Analytics, May 8, 2019, 2 pages.

\* cited by examiner $\mu_e(\Delta t)$ $$S_n(t) = \frac{\int_0^t I_n(t)dt}{\int_0^\infty I_n(t)dt}$$

$\mu_{e1}(\Delta t_1)$ $\mu_{e2}(\Delta t_2)$

METHOD FOR DETERMINING A PHYSICAL PROPERTY RELATED TO A CHARGE OF A CONSTITUENT OF A SAMPLE, FROM FIELD FLOW FRACTIONATION MEASUREMENTS WITH AN ADDITIONAL ELECTRICAL FIELD, AND APPARATUS THEREFOR

TECHNICAL FIELD

The present invention relates to a method for determining a physical property related to a charge of a constituent of a sample, from field flow fractionation measurements with an additional electrical field and an apparatus for determining a physical property related to a charge of a constituent of a sample, from field flow fractionation measurements with an additional electrical field.

TECHNICAL BACKGROUND

Conventional field flow fractionation methods using an additional field often apply an electrical field for measuring physical properties related to the charge of constituents of a sample, e.g., the electrophoretic mobility, suspended in a solvent.

Applying conventional techniques, the physical parameters related to the charge of constituents are usually obtained based on a comparison of time-values related to two peaks of fractograms. Here, each fractogram has been obtained for different field-strengths of an electrical field. E.g., the electrophoretic mobility of constituents of a sample is often obtained based on a time difference between corresponding peaks of a first fractogram and a second fractogram.

The commonly used data represented by fractograms provides only a non-bijective mapping of measurement-values over time. An exception thereof are the peaks of a fractogram, which allow for a bijective mapping between measurement-values and time. Thus, electrophoretic mobilities are usually computed based only on these peaks. This limits the conventional methods for determining electrophoretic mobilities.

SUMMARY

One of the objects of the present disclosure is to overcome at least one of the above prior art problems or to improve at least one of the prior art solutions. The object is achieved by the subject-matter of the independent claims. Further preferred embodiments are given by the subject-matter of the dependent claims.

DETAILED DESCRIPTION

Figure 1:
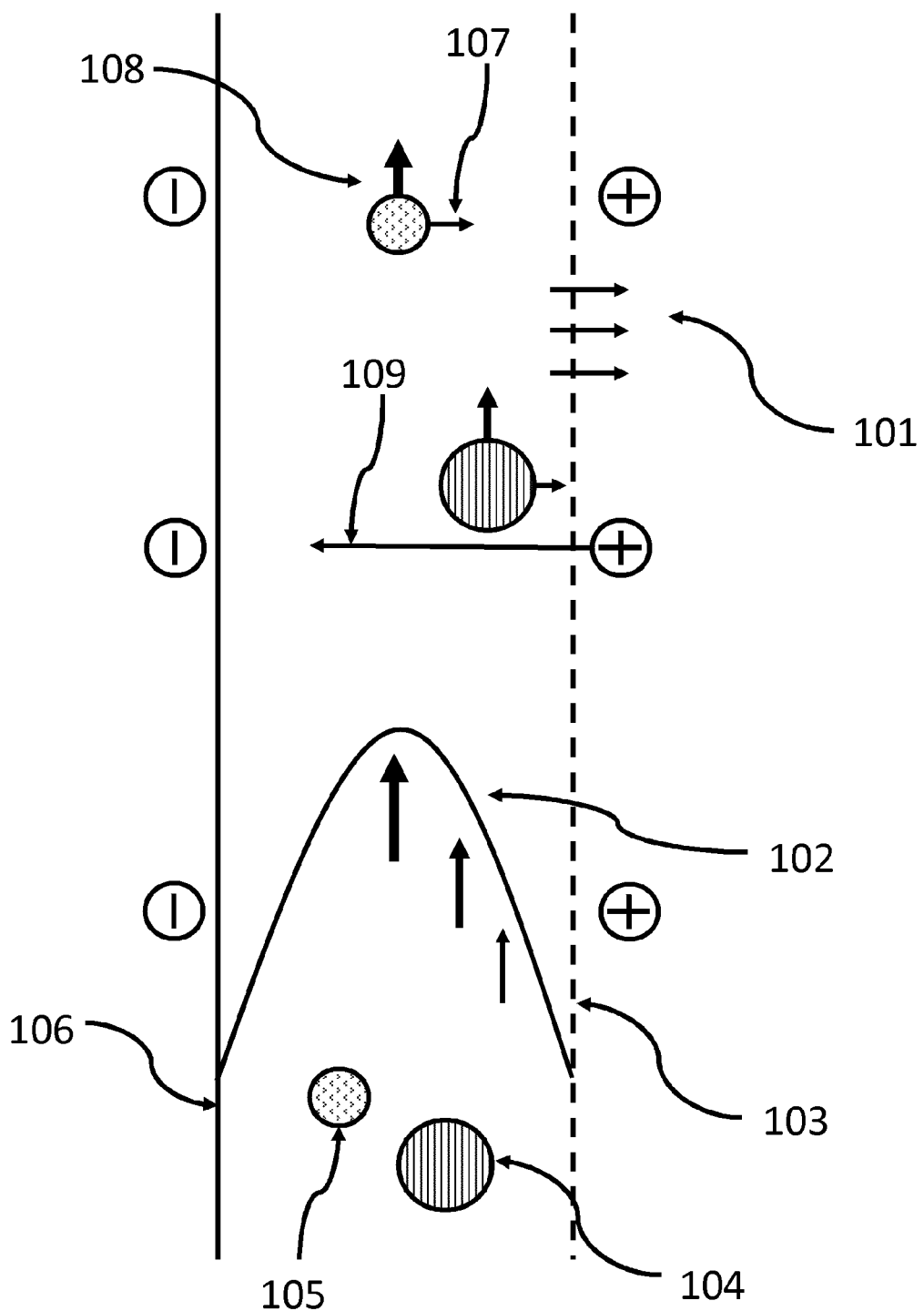
FIG. 1 shows a sketch of a known electrical asymmetrical flow field flow fractionation setup.

FIG. 1 shows a sketch of a known electrical asymmetrical flow field flow fractionation setup. Within this setup, a sample comprising constituents, such as a first constituent 104, and a second constituent 105 flows through a channel formed by two channel-walls, namely a first wall 103 and a second wall 106. Wherein the first wall 103 may be referred to as accumulation wall. The corresponding opposite wall 106 may then be referred to as "top wall". By using said walls, a thin ribbon-like channel may be configured. Due to the parabolic flow profile 102 and the physical properties of the constituents, constituents entering the channel at the same time but with distinct properties reach the end of the channel at different times. Constituents usually are part of a sample, wherein the sample is suspended in a solvent which flows through the channel. In addition to the force 108 exerted by the flow field, a transversal flow field 101 can be generated by using a membrane 103. Furthermore, if the constituents carry a charge, an additional electrical field 109 can be generated using electrodes at the channel-walls. Thereby, a summation-field of transversal forces 107 may be generated.

Figure 2:
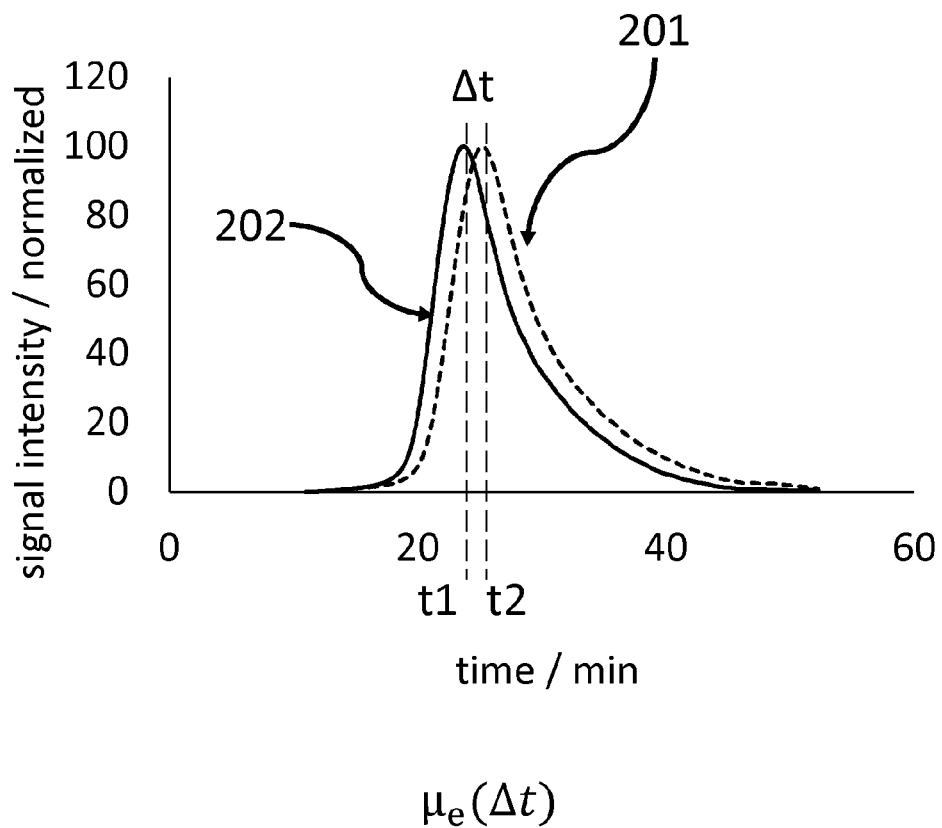
FIG. 2 illustrates a known way of computing the electrophoretic mobility from a time difference between peaks of two fractograms.

FIG. 2 illustrates a known way of computing the electrophoretic mobility from a time difference between peaks of two fractograms. Here, a first fractogram 201 and a second fractogram 202 are depicted. Each fractogram has a peak (a local maximum). Each peak corresponds to a specific time-instance, t1 and t2. Given both time-instances, a time difference $\Delta t$ is computed, e.g., by $\Delta t = t2 - t1$. From this time difference $\Delta t$, using techniques of the prior art, an electrophoretic mobility $\mu(\Delta t)$ of a constituent of the sample corresponding to one of the fractograms can be computed.

Figure 3:
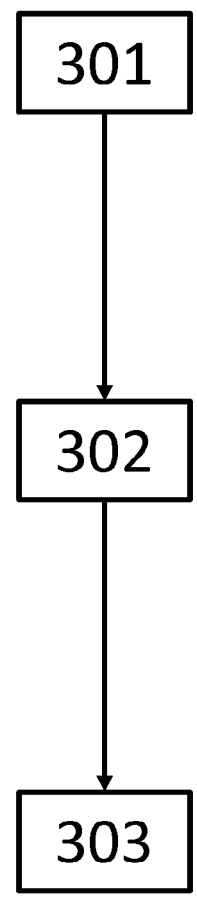
FIG. 3 shows an embodiment of a method for determining a physical property related to a charge of a constituent of a sample, from field flow fractionation measurements with an additional electrical field.

FIG. 3 shows a flowchart corresponding to an embodiment of a method for determining a physical property related to a charge of a constituent of a sample, from field flow fractionation measurements with an additional electrical field, comprising the following steps of obtaining 301 a first fractogram of a first sample and a second fractogram of a second sample, wherein the first sample and the second sample are samples of a same substance, the first fractogram has been generated using a first electrical field, the second fractogram has been generated using a second electrical field, and a strength of the first electrical field and a strength of the second electrical field are different from each other, and determining 302, by using a first mapping, from a first intensity value of the first fractogram, a first value and determining, by using a second mapping, from a second intensity value of the second fractogram, a second value, and determining 303, based on the first value and the second value, a physical property related to a charge of a constituent of at least one of the first sample and the second sample, wherein the first mapping maps the first intensity value to the first value of a first bijective function over time and the second mapping maps the second intensity value to the second value of a second bijective function over time.

Thanks to this solution, especially by determining a first value and a second value using the mentioned mapping, it is possible to compute a physical property related to a charge of a constituent of a sample for various time instances of a fractogram. Moreover, in comparison to other techniques which use multiple detectors, the physical properties related to a charge of a constituent of a sample can be computed by using one detector only.

According to the embodiment, the method discussed may be computer-implemented, there may be a data processing apparatus comprising means for carrying out the method, there may be computer program (product) comprising instructions which, when the program is executed on a computer, cause the computer to carry out the method, and there may be a computer-readable (storage) medium or data carrier comprising instructions which, when executed by a computer, cause the computer to carry out the method.

Moreover, a sample usually is a liquid (fluid) in which constituents are immersed/suspended. The sample may also be referred to as a suspension, which contains or comprises the constituents. Usually, such as suspension is a heterogeneous mixture of a fluid, or solvent, and particles. Usually, samples are diluted before being injected into a field flow fractionation system. This is often done by adding a further fluid, such as water or another buffer, to the sample. The sample may be a polydisperse sample, a complex sample or an inhomogeneous sample. Usually, a sample is added to a carrier solution (dilute solution). The carrier solution may be a fluid in which the sample is immersed. Moreover, the carrier solution may be a fluid which is added or injected into the channel when performed field flow fractionation measurements. The sample may then be pumped through such a field flow fractionation channel after injection of the sample into the channel by applying a flow field to the channel. Specifically, as a non-limiting example, a sample may comprise a number of first particles (constituents) which are added to (immersed in) a carrier solution and a number of second particles (constituents) which are added to the carrier solution. The first and second particles may have different physical properties, comprising hydrodynamic radii, electrical surface charge, mass, density, and so on. There may be a plurality of types of particles which are immersed in the solvent.

A constituent of the sample is a part of the sample, which, alongside other parts, forms the sample. Usually, field flow fractionation measurements are performed for determining properties of these constituents. The term 'constituent' may refer to the above-mentioned particles, which are immersed in carrier solution. For instance, a sample may comprise two constituents. E.g., a sample may comprise a first number of first particles and a second number of second particles, wherein these particles are solved in the carrier solution.

A field flow fractionation measurement with an additional electrical field, which is used in field flow fractionation measurement refers to a measurement applying known field flow fractionation techniques, wherein a first main separation field exists, and, in addition thereto, a secondary, additional electrical separation field is generated and used. Thereby, the discussed field flow fractionation measurement differs from conventional electrical field flow fractionation techniques. For example, a known field flow fractionation technique may be asymmetrical flow field flow fractionation, where the first main separation field may be a transversal, flow field, which is generated by a membrane at channel-walls of a flow field fractionation device. The additional electrical separation field may be generated by electrodes at the side-walls of a fractionation channel.

Obtaining a fractogram may refer to receiving data or information which represents a fractogram. The data representing the fractogram may have been obtained or generated beforehand by field flow fractionation measurements. The data may be received by an apparatus carrying out the discussed method. The apparatus may be specifically designed for receiving and processing fractograms in the manner discussed. For instance, the apparatus may be a field programmable gate array, FPGA, which has been configured to receive and process fractograms in the manner discussed. The apparatus may also be a conventional data-processing device, which is able to process any type of data. For instance, the apparatus may be a computer, a personal computer, or a laptop. The data representing a fractogram may be stored on a commonly known data-storage medium. For instance, a fractogram or multiple fractograms may be saved on a USB stick and be obtained by the apparatus through plugging in the USB stick to a USB port of the apparatus (computer). However, the data may also be stored on another device, such as a server, and be transmitted to the apparatus using wireless transmission techniques or using cable-based transmission techniques.

A fractogram usually is (a set of) data representing the result of a field flow fractionation measurement. Often, a fractogram comprises a set or plurality of intensity values over time. E.g., a fractogram may comprise two data-sets: first, counts of particles detected by a single detector at the end of a field fractionation channel, and second, corresponding time-instances at which the counts have been measured. There exist various techniques for obtaining fractograms in the prior art, each of which may be used for generating the fractogram.

Samples of a same substance may refer to samples which are each taken from the same super-sample, wherein the super-sample provides the substance. E.g., a first sample and a second sample may each be generated by branching off a portion of the super-sample. In other words, the substance may be provided in a container, wherein the first sample is generated by taking a part of the substance out of the container, and the second sample is generated by taking another part of the substance out of the container by techniques known in the field of field flow fractionation. However, these examples are not limiting. For instance, as an alternative, the first sample and the second sample may each be taken from two different super-samples, wherein each of these super-samples has the same physical properties, e.g., physical properties related to a charge of a constituent of the respective super-sample. For instance, a first sample may be taken from a first container and a second sample may be taken from a second container, wherein both container comprise a suspension having the same physical properties. Moreover, as a further alternative, the second sample may be the first sample, wherein the first sample is getting reused. E.g., the first sample, after having been measured by a first field flow fractionation measurement, may be reintroduced into the field flow fractionation measurement device and thereby (re)used as a 'second sample', when generating the second fractogram.

Strengths of the first electrical field and the second electrical field being different from each other refers to the case that both electrical fields have field-strengths which are different from each other. For example, the first electrical field may have a first (field) strength, the second electrical field may have a second (field) strength, and the first field strength may be larger than the second field strength. As another example, the second field strength may be larger than the first field strength. As another example, the first field strength may be smaller than the second field strength. As another example, the second field strength may be smaller than the first field strength. The terms 'strength of an electrical field' or 'electrical field strength' here refer to the concepts known in the art, such as a quantitative expression of the intensity of an electric field at a particular location, which is usually expressed in volt per meter. The expression of 'Volts per meter' is in derived SI units. This expression may also be expressed in SI basic units as $(kg \times m) \div (A \times s^3)$, wherein "x" denotes multiplication and "÷" denotes division.

Determining a (first/second) value from an (first/second) intensity value of a fractogram by using a (first/second) mapping refers to applying a mathematical operation, e.g., a mapping, to at least one of the intensity values comprised in a fractogram, and thereby obtaining another value. A common example of a mathematical operation is taking a sum. Further optional specifics of the mapping are discussed throughout and defined by the below embodiments.

Determining, based on the first value and the second value, a physical property related to a charge of a constituent refers to computing a result of a mathematical operation and thereby computing said property. The mathematical operation may take the first value and the second value as input. Based on the result of the mathematical operation, by using methods known in the field of field flow fractionation, the physical property, such as the electrophoretic mobility, may be computed. The following publications provide examples of said methods:

C. Johann, S. Elsenberg, H. Schuch, U. Rösch; in *Anal. Chem.* 2015, 87, 8, 4292-4298.

Drexel, R.; Siupa, A.; Carnell-Morris, P.; Carboni, M.; Sullivan, J.; Meier, F.; "Fast and Purification-Free Characterization of Bio-Nanoparticles in Biological Media by Electrical Asymmetrical Flow Field-Flow Fractionation Hyphenated with Multi-Angle Light Scattering and Nanoparticle Tracking Analysis Detection", in *Molecules* 2020, 25, 4703.

Further optional details of the aspect of determining a physical property are discussed throughout the following embodiments.

Mapping an (first/second) intensity value to a (first/second) value of a (bijective) function (over time) refers to obtaining said value by applying a mathematical operation. The mathematical operation may correspond to an algorithm implemented in software. Said algorithm may process data comprised in a fractogram and thereby generate another set of data. The mathematical operation assigns to at least a first element of a first set, e.g., data provided by a fractogram, another, second element (data point) of a second set of data. In other words, at least one data point of a first data-set provided by a fractogram, e.g. an intensity value, is converted (mapped) into another data point, the value, of a second data set. Importantly, the first type of data, or the first data set, has mathematical properties which are different from the mathematical properties of the second type of data, or the second data set. For instance, the first type of data may be non-bijective over a data set comprising time-instances, where field flow fractionation measurements have been performed, whereas the second type of data is bijective to said data set comprising said time-instances. A simple example of a mapping is taking the sum over a set of values. The below embodiments discuss further aspects of the mapping used.

Moreover said mathematical operation which may be implemented as a software algorithm on a computer allows for obtaining said value, having a one-to-one correspondence to time-instances where field flow fractionation measurements have been performed, for arbitrary time-instances comprised in a fractogram. This property distinguishes said software algorithm from cases where data points, e.g., intensity values, of a fractogram are converted into another set of data by determining the local maximum (peak) or local maxima (a plurality of peaks) comprised in fractogram-data. In said cases, the elements of the other set of data do not provide a one-to-one correspondence with arbitrary, or all, time-instances comprised in a fractogram. For example, by using the method discussed herein, a value (which may also be referred to as 'relative amount') may be obtained for any time instance within the measurement time interval of a fractogram. E.g., with reference to FIG. 2, said value may be obtained at a time instance t=25 min (minutes) or at a time instance t=30 min, wherein the measurement time interval may reach from t=10 min to t=50 min. As another example, as shown in FIG. 2, a fractogram 201 may have a peak, which, using an algorithm which determines the local maxima (or, alternatively, the maximum) of the fractogram, would be converted into one data-element in a one-to-one correspondence with time instance t1. However, for the remaining time-instances comprised in the fractogram, e.g., where time t=20 min in FIG. 2, using an approach based on the local maxima of a fractogram fails at providing a one-to-one correspondence between converted values and time-instances provided in the fractogram.

A (first/second) value of a (first/second) bijective function over time refers to that there is a one-to-one correspondence between said value and a time instance (data point reflecting a time instance). A bijective function is invertible. In other words, given a value, one can find one, and only one, corresponding time instance. There may exist multiple values which each are in one-to-one correspondence to a time value out of a plurality time values. In other words, the value and a corresponding time-value are each an element of two distinct sets. E.g., each element of a first set, said value, is paired with exactly one element of second set, e.g., said time-value, and each element of the second set is paired with exactly one element of the first set.

Advantageously, the above embodiment, especially by using the mapping, allows for converting two conventional fractograms into data-sets, which each provide data-points in a one-to-one correspondence to (in a bijective relation to) the time values of a fractogram. Based thereon, time-differences can be computed over multiple data-points of a fractogram. Therefore, a wide range of electrophoretic mobilities can be obtained from two fractograms, using one detector only. In comparison thereto, conventional techniques only allow computing a time-difference between peaks, (local) maxima or (local) minima, of two fractograms. Thus, the physical properties related to the charge of constituents, e.g., the electrophoretic mobility, can be computed for a wide range of time values based on two fractograms only. Thus, the applicability of field flow fractionation measurements is improved and the whole process of obtaining physical properties is simplified.

The above embodiment may optionally comprise the additional steps and configuration and definitions discussed throughout the following embodiments.

According to another embodiment of the method, the physical property related to a charge is at least one of a charge, a surface charge, an electrophoretic mobility, a zeta potential.

The term charge refers to the term 'electric charge' within its commonly known meaning. E.g., electric charge may be a physical property of (charged) matter that causes the charged matter to experience a force when placed in an electromagnetic field. Charge is usually expressed in units of Coulomb. Charge may also be referred to as net charge.

The term surface charge refers to what is commonly known in the art under this term. For instance, this term may refer to electric charges which are basically constrained on a two dimensional surface. In other words, this term may refer to an almost two dimensional surface with non-zero electric charge. For example, the here discussed surface may be the surface of one of the constituents of the above discussed sample. Surface charge is usually expressed in units of coulombs per square meter.

The term 'electrophoretic mobility' refers to what is usually known in the art. For instance, electrophoretic mobility $\mu$ is often referred to as the proportionality constant linking the drift velocity v of a charged particle which is suspended in a liquid and subjected to an external electric field E, $v \propto \mu E$. Here, the liquid, for instance, may be an insulating liquid or an electrolyte solution. The liquid may be any liquid used for suspending samples therein in field flow fractionation techniques. The terms 'liquid' and 'fluid' may be used interchangeably. A suspension refers to a heterogeneous mixture of such fluid and particles, for instance, the constituents of the discussed sample.

The term zeta potential refers to the electrical potential at the slipping plane, as is known in the prior art. Herein, the slipping plane may be an interface dividing a fluid which remains attached to the surface of a particle immersed in the fluid from another part of the fluid, which is mobile, e.g., does not remain attached to the particle. Further information on the term zeta potential is discussed below.

Advantageously, using the above discussed definitions of the physical property provides a parameter which is comparable to other measurements.

The above embodiment may optionally comprise the additional steps and configuration and definitions discussed throughout the following embodiments.

According to another embodiment of the method, the physical property related to a charge is a distribution of at least one of a charge, an electrophoretic mobility, and a zeta potential.

Herein, the term distribution refers to a set of data points of the mentioned charge, an electrophoretic mobility, and a zeta potential, wherein the set of data points refers to a plurality of data points, or at least two data points, each reflecting a value of charge, electrophoretic mobility, or zeta potential.

Advantageously, using a distribution of said properties allows for assessing a functional dependency between said properties and other features of constituents of a sample. An example thereof may be assessing the relationship between electrophoretic mobility and the hydrodynamic radius of a constituent in a sample.

The above embodiment may optionally comprise the additional steps and configuration and definitions discussed throughout the following embodiments.

According to another embodiment of the method, the strength of the first electrical field is about zero, and the strength of the second electrical field is nonzero.

A (field) strength being about zero refers to said field strength being approximately zero, being almost zero, being zero within measurement-accuracy, or taking on values which are close to zero. A (field) strength about zero may be reached by performing field flow fractionation measurements without activating (supplying currents to) electrodes which are placed at the second 106 and the first wall 103 of a fractionation channel. For electrical asymmetrical flow field flow fractionation, a first electrode may be placed below the first wall 103, which may be called accumulation wall. A field strength being nonzero refers to said field strength having an absolute value which is (within measurement accuracy) unequal to zero. A (field) strength unequal to zero may be reached by performing field flow fractionation measurements using activated (supplying currents to) said electrodes which generate the additional electrical field.

Advantageously, the first field strength of the first electrical field being about zero, and the field strength of the second electrical field being nonzero allows for increased determination accuracy since the reference electrical field, having a field strength about zero, is defined more clearly.

The above embodiment may optionally comprise the additional steps and configuration and definitions discussed throughout the following embodiments.

According to another embodiment the strength of the second electrical field is within a range from −50 volts per meter to +50 volts per meter.

Further examples comprise the case where the second electrical field is within a range from −20 volts per meter to +20 volts per meter. Alternatively, the mentioned ranges may be expressed using absolute values. E.g., the phrase 'is within a range from −50 volts per meter to +50 volts per meter' may be expressed as 'the absolute value of the electrical field is 50 volts per meter maximum'. The abovementioned range is usually applied when using aqueous solutions, for example, where the solvent, in which the sample is suspended in, is water. Theoretical applications may use field strengths exceeding the above range. The applicable range may depend on the properties of the solvent used for performing field flow fractionation measurements. For example, when using non-conductive media as solvent, field strengths with an absolute value of several (ten-) thousands of Volts per meter (several 10 kV/m) may be used.

Advantageously, using a field strength within the mentioned range allows for an improved measurement accuracy because said field strength is adapted to the properties of the solvent used.

The above embodiment may optionally comprise the additional steps and configuration and definitions discussed throughout the following embodiments.

Figure 4A:
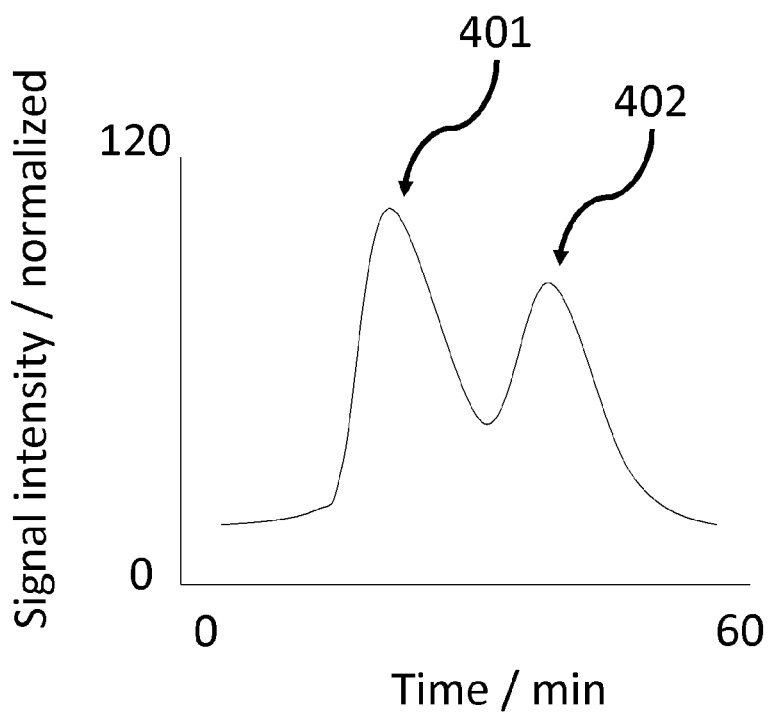
FIG. 4*a* and FIG. 4*b* show a sketch of fractograms according to an embodiment wherein the first fractogram and the second fractogram comprises a plurality of peaks.
Figure 4B:
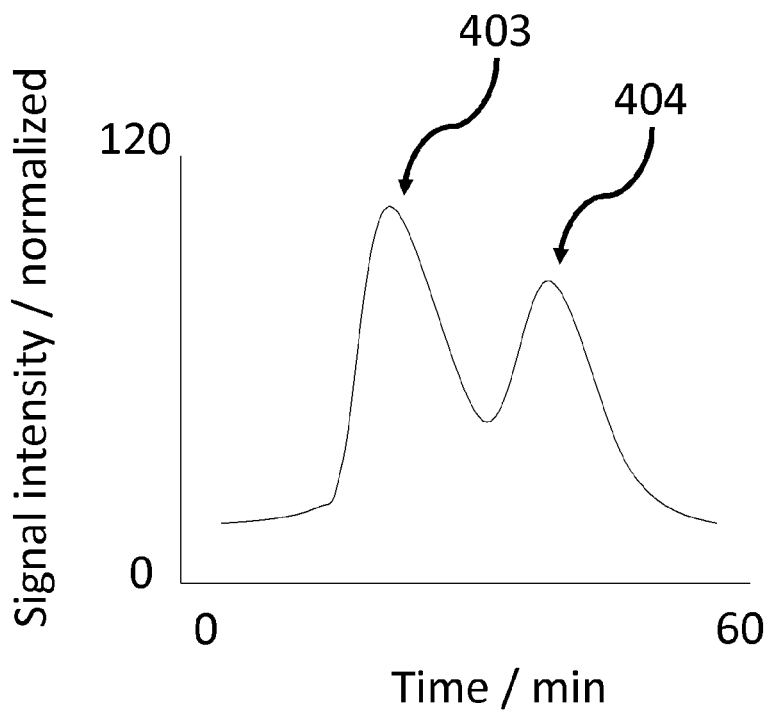

FIGS. 4a and 4b show a sketch of fractograms according to an embodiment wherein the first fractogram and the second fractogram each comprise a plurality of peaks. Here, FIG. 4a shows a sketch of a first fractogram comprising measured signal intensity values over time. The fractogram shows two peaks (local maxima) of said intensity values, namely a first peak 401 and a second peak 402.

FIG. 4b shows a sketch of a second fractogram comprising measured signal intensity values over time. The fractogram shows two peaks (local maxima) of said intensity values, namely a first peak 403 and a second peak 404.

Advantageously, applying the discussed method to the case where fractograms have multiple peaks allows for improved efficiency when determining physical properties, such as surface-charge, for at least two time-points of a fractogram, because the physical property need not be computed for subsequent peaks, but can be computed for the whole fractogram.

The above embodiment may optionally comprise the additional steps and configuration and definitions discussed throughout the following embodiments.

According to another embodiment, the first and second fractogram have been obtained by at least one of electrical symmetrical flow field flow fractionation, electrical asymmetrical flow field flow fractionation, electrical centrifugal field flow fractionation, electrical thermal field flow fractionation, electrical gravitational field flow fractionation.

The above field flow fractionation techniques are known in the prior art and usually deployed when measuring various further characteristics of a sample. For instance, electrical asymmetrical flow field flow fractionation techniques apply a transversal, flow field, often called 'cross flow field', generated by a membrane at one of the channel-walls used in field flow fractionation measurements. Applying this technique usually allows for improved separation of constituents of a sample, which may yield various more pronounced peaks in the respective fractogram.

Advantageously, combining one of the mentioned field flow fractionation techniques with the method discussed in above and below embodiments improves accuracy of the system, since it improves the separation of constituents in the sample. As a further advantage, combining the mentioned field flow fractionation techniques with the said method allows for determining additional characteristics of the sample.

The above embodiment may optionally comprise the additional steps and configuration and definitions discussed throughout the following embodiments.

Figure 5:
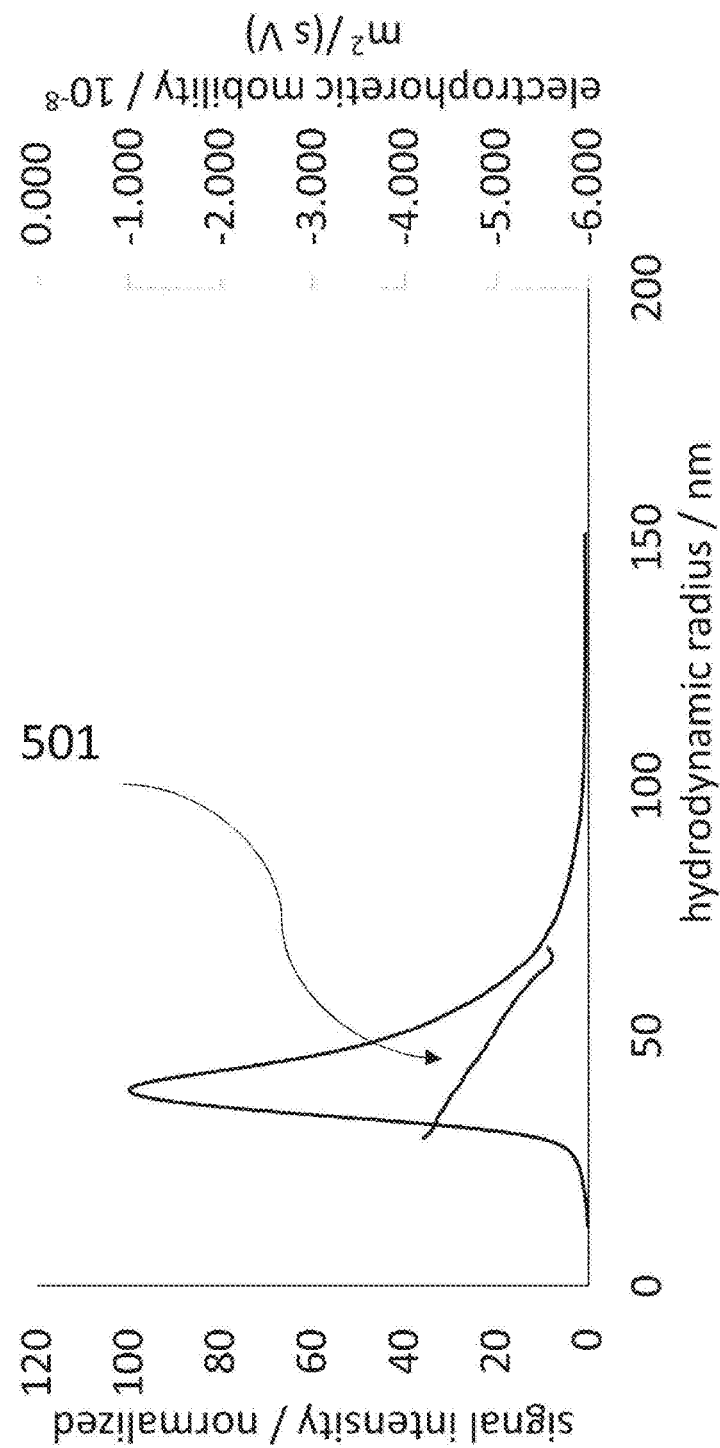
FIG. 5 shows another embodiment of the method for determining a physical property related to a charge of a constituent of a sample, from field flow fractionation measurements with an additional electrical field.

FIG. 5 shows another embodiment where the method comprises the further step of deriving at least one of a hydrodynamic radius, and a distribution of hydrodynamic radii, from at least one of the first fractogram and the second fractogram.

Commonly known methods in the field of field flow fractionation, which are used for determining said hydrodynamic radius or a distribution of hydrodynamic radii from a fractogram may be used. The term 'hydrodynamic radius' refers to what is commonly known in the art. Using these methods, a distribution of (plurality of data-points reflecting) hydrodynamic radii may be obtained from fractogram-data. Moreover, after deriving the hydrodynamic radius or a distribution of hydrodynamic radii, in a further comparing step, said hydrodynamic radius or a distribution of hydrodynamic radii may be compared to the physical properties. For instance, as can be seen in FIG. 5, time instances of a fractogram's abscissa are replaced by values of the hydrodynamic radius. In combination with the curve representing the physical properties related to a charge of constituents 501, in the present example: electrophoretic mobility, various physical relationships between hydrodynamic radius and physical properties may be determined. For example, it may be quantified how the electrophoretic mobility decreases with increasing hydrodynamic radius. Hydrodynamic radius and distribution of hydrodynamic radii are properties of constituents of a sample, as well. E.g., a constituent (each of a set of particles suspended in a solvent) may have the same or almost the same hydrodynamic radius.

Advantageously, because said hydrodynamic radius or a distribution of hydrodynamic radii can be compared to said physical properties, a relationship between these properties of a constituent of a sample may be obtained and a corresponding quantification may be made easily. Thereby, the processing efficiency and applicability of field flow fractionation measurements is improved.

The above embodiment may optionally comprise the additional steps and configuration and definitions discussed throughout the following embodiments.

According to another embodiment, the method comprises the further steps of generating the first fractogram by field flow fractionation measurements using the first electrical field as an additional electrical field, and generating the second fractogram by measuring the second sample by field flow fractionation measurements using the second electrical field as an additional electrical field.

Here a fractogram may be generated by conventional field flow fractionation techniques that apply an electrical field as an additional electrical field. As discussed above, the discussed method may be computer implemented. Then, in order to generate a fractogram, a conventional computer, in which the method is implemented, may control a conventional field flow fractionation device such that it performs corresponding field flow fractionation measurements. The computer may perform the control remotely. For example, the computer may be configured separately from the conventional field flow fractionation device. Then, the computer may control the field flow fractionation device via wireless communications or via wired communications. Alternatively, the computer may be integrated into (be a part of) a conventional field flow fractionation device.

The above embodiment may optionally comprise the additional steps and configuration and definitions discussed throughout the following embodiments.

Figure 6:
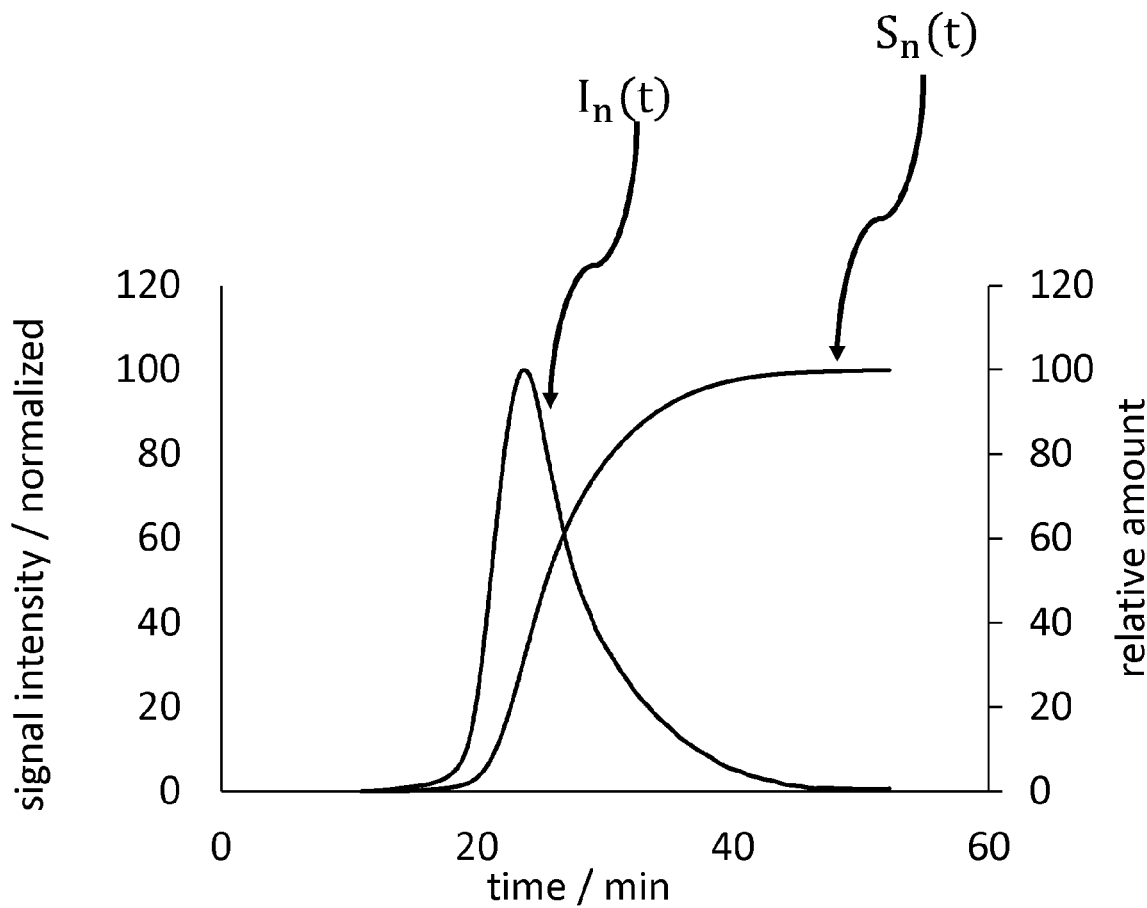
FIG. 6 shows another embodiment of the method for determining a physical property related to a charge of a constituent of a sample, from field flow fractionation measurements with an additional electrical field.

FIG. 6 shows another embodiment wherein using the first mapping comprises obtaining the first value by integrating a plurality of intensity values of the first fractogram over a time-interval, and using the second mapping comprises obtaining the second value by integrating a plurality of intensity values of the second fractogram over a time-interval.

FIG. 6 shows a fractogram where intensity values are plotted over time, $I_n(t)$. Furthermore, the ordinate on the left hand side denotes intensity values, the ordinate on the right hand side denotes relative amounts. The terms 'relative amount' and 'value' may be used interchangeably. E.g., a 'first value' may be referred to as 'first relative amount'. FIG. 6 shows a non-limiting example of a value, namely a set of values $S_n(t)$, which is obtained integrating the intensity values over a time interval.

The (first or second) time interval may be a subset of the measurement time interval. E.g., with reference to FIG. 6, the measurement time interval may reach from t=10 min (minutes) (or t=0 min) to t=55 min, and the (integration) time interval may reach from t=0 min to t=25 min, which corresponds to a value (relative amount) of $S_n(t=25\ min)$. The (integration) time interval is not limited by this example. Specifically, the integration time interval's starting point may be a time-instance which is nonzero, e.g., t=10 min. Of course, time instances, the measurement time interval and the integration interval may also be expressed in seconds or any other physical unit which may reflect time.

Here, the (first or second) value discussed may be referred to as either the first value or the second value discussed throughout above embodiments. Integrating refers to the mathematical operation of calculating an integral over a range, e.g., a time-interval. For instance, the intensity data (values) provided by a fractogram may be integrated from a first time-instance to a second time-instance. The integral may be performed by computational methods known in the prior art, e.g., by using the Riemann sum. Furthermore, the integral may be normalized by techniques known in the art.

As an example, the value may be denoted by $S_n(t)$, and be computed according to equation 1.

$$S_n(t) = \frac{\int_0^t I_n(t)dt}{\int_0^\infty I_n(t)dt} \quad \text{(eq. 1)}$$

wherein $I_n(t)$ denotes intensity-values of the fractogram measured at time t and n denotes the index of a respective fractogram. E.g., the first fractogram may have index n=1 and the second fractogram may have index n=2. The denominator on the right hand side of equation (1) is the normalization constant. The normalization constant here may be approximated using known numerical techniques. The nominator is the integral mentioned above. Thus, by integrating the set of intensity values up to a time t there can be obtained a value $S_n(t)$, or a set of such values for subsequent time increments, $S_n(t_i)$ for, e.g., i=0, ..., m. As can be seen from equation (1) the integral in the nominator reaches from 0 to t. However, other integration intervals may be possible. For example, any interval starting at a time-instance t1 and ending at another time instance t2 may be used.

Advantageously, using the above mapping allows to compute a value which is part of a set of values which, when taken as mathematical function, is bijective. This allows for computing the discussed physical property, e.g., the electrophoretic mobility, based on arbitrary time instances, whereas the commonly used techniques are restricted to using the time-instances linked to the peaks of fractograms.

The above embodiment may optionally comprise the additional steps and configuration and definitions discussed throughout the following embodiments.

According to another embodiment, the first value is a cumulative distribution and the second value is a cumulative distribution.

Herein, the term 'cumulative distribution function' refers to what is known in mathematics as cumulative distribution function. Specifically, said function has the property that it is non-decreasing and right-continuous and satisfies the following conditions:

$$\lim_{x \to -\infty} F_X(x) = 0, \lim_{x \to +\infty} F_X(x) = 1. \quad \text{(eq. 2)}$$

Wherein $F_X(x)$ is a cumulative distribution function. In other words, the first and second value here may be regarded as a set of data points F and t. Here, F can be regarded as a function of t, i.e. F(t), or $F_i(t_i)$ for a set of i=0, ..., m data points. Such distribution of data points then has the properties as mentioned. The plot of $S_n(t)$ in FIG. 6 provides a corresponding example.

Moreover, the cumulative distribution function may be bijective and/or continuous, wherein both terms refer to the corresponding mathematical properties known in the art.

Specifically, the cumulative distribution may provide a said data set F which is bijective to a set T, which comprises the time-instances t where field flow fractionation measurement results have been obtained (measured).

Advantageously, the properties of said cumulative distribution function allow for determining said first and second values at arbitrary time points where there is a one-to-one correspondence between said values and corresponding time points. Thereby, based on said first and second value, the physical property related to a charge of a constituent of a sample can be determined at various times measured by field flow fractionation. This, in comparison to conventional field flow fractionation techniques, allows for an improved applicability.

The above embodiment may optionally comprise the additional steps and configuration and definitions discussed throughout the following embodiments.

Figure 7:
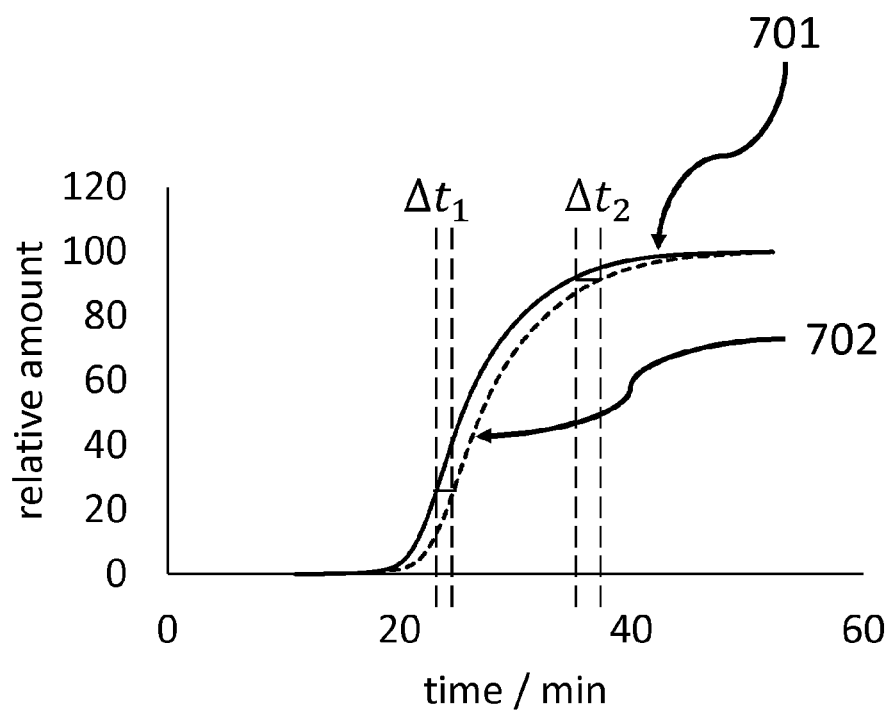
FIG. 7 shows another embodiment of the method for determining a physical property related to a charge of a constituent of a sample, from field flow fractionation measurements with an additional electrical field.

FIG. 7 shows another embodiment where determining, based on the first value and the second value, the physical property related to a charge of a constituent comprises computing a difference based on the first value and the second value, and determining the physical property based on the difference.

Specifically, the difference may be a time-difference between time-points corresponding to said values. E.g., the first value may correspond to a first time instance t1 and the second value may correspond to a second time instance t2. The time difference $\Delta t$ may then either be computed as $\Delta t=t2-t1$ or $\Delta t=t1-t2$.

The physical property, such as the electrophoretic mobility, surface charge, or zeta function, can then be determined based on said (time) difference by commonly known techniques, e.g., by techniques or algorithms applied to field flow fractionation techniques with an additional electrical field.

In line therewith, FIG. 7 shows an example where two time differences, $\Delta t1$ and $\Delta t2$, each an example of said difference are computed based on a first cumulative distribution function 701, an example of a first value, and a second cumulative distribution function 702, an example of a second value. For each of these two time differences, an electrophoretic mobility, $\mu_{e1}(\Delta t_1)$ and $\mu_{e2}(\Delta t_2)$, an example of a physical property related to a charge of a constituent, can be computed based on known techniques in the field of field flow fractionation.

Advantageously, computing the difference on the first value and the second value allows for computing the difference, and hence the physical property for arbitrary time-points of a fractogram. Thereby, the applicability of field flow fractionation techniques using an additional electrical field is increased.

Figure 8:
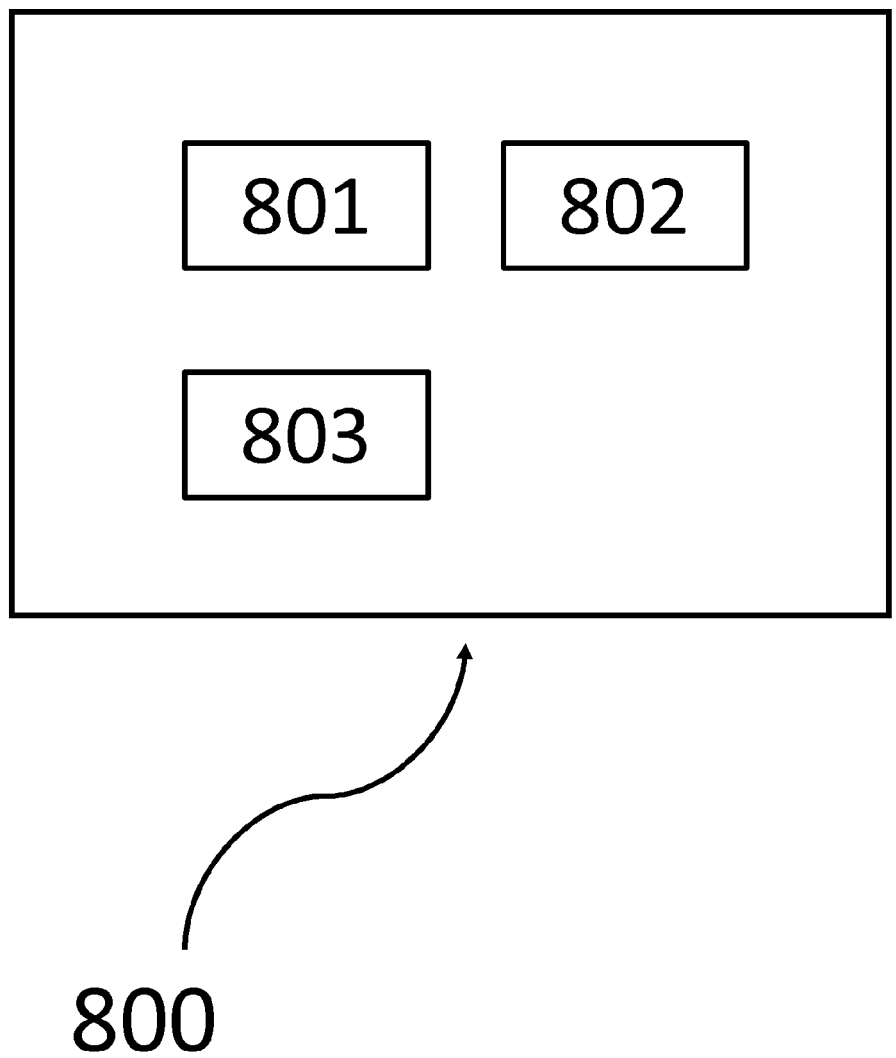
FIG. 8 shows an embodiment of an apparatus for determining a physical property related to a charge of a constituent of a sample, from field flow fractionation measurements with an additional electrical field.

FIG. 8 shows an embodiment of an apparatus 800 for determining a physical property related to a charge of a constituent of a sample, from field flow fractionation measurements with an additional electrical field. The apparatus 800 may be configured to carry out the operations and steps as discussed throughout the above embodiments.

For example, the apparatus comprises an obtainer 801, and a determiner 802. The obtainer 801 may be configured to obtain (may be for obtaining) a first fractogram of a first sample and a second fractogram of a second sample, wherein the first sample and the second sample are samples of a same substance, the first fractogram has been generated using a first electrical field, the second fractogram has been generated using a second electrical field, and a strength of the first electrical field and a strength of the second electrical field are different from each other. Examples of an obtainer comprise a wireless interface, a wired interface. Further examples comprise a USB port of a computer or a wifi wireless serial port.

The determiner may be configured to determine, by using a first mapping, from a first intensity value of the first fractogram, a first value and determining, by using a second mapping, from a second intensity value of the second fractogram, a second value; and configured to determine, based on the first value and the second value, a physical property related to a charge of a constituent of at least one of the first sample and the second sample.

Herein the first mapping may map the first intensity value to the first value of a first bijective function over time and the second mapping may map the second intensity value to the second value of a second bijective function over time.

Here, a determiner may be any device capable of processing data by performing logical operations and/or mathematical operations. For instance, a determiner may be a central processing unit, a processor, a computer.

The above embodiment may optionally comprise the additional steps and configurations and definitions discussed throughout the above and below embodiments.

In a further embodiment, the apparatus further comprises a generator 803. The generator may be configured to generate the first fractogram by measuring the first sample by field flow fractionation measurements using the first electrical field as an additional electrical field and, to generate the second fractogram by measuring the second sample by field flow fractionation measurements using the second electrical field as an additional electrical field.

For example, a generator may be a field flow fractionation device known in the prior art, which is capable of performing field flow fractionation measurements with an additional electrical field. A specific example of said generator is a device configured to perform electrical asymmetrical flow field flow fractionation measurements. The generator may be configured to receive instructions from the apparatus, whereby the apparatus instructs the generator to perform said measurements and to transmit the results, e.g., fractograms, to the obtainer of the apparatus.

Figure 9:
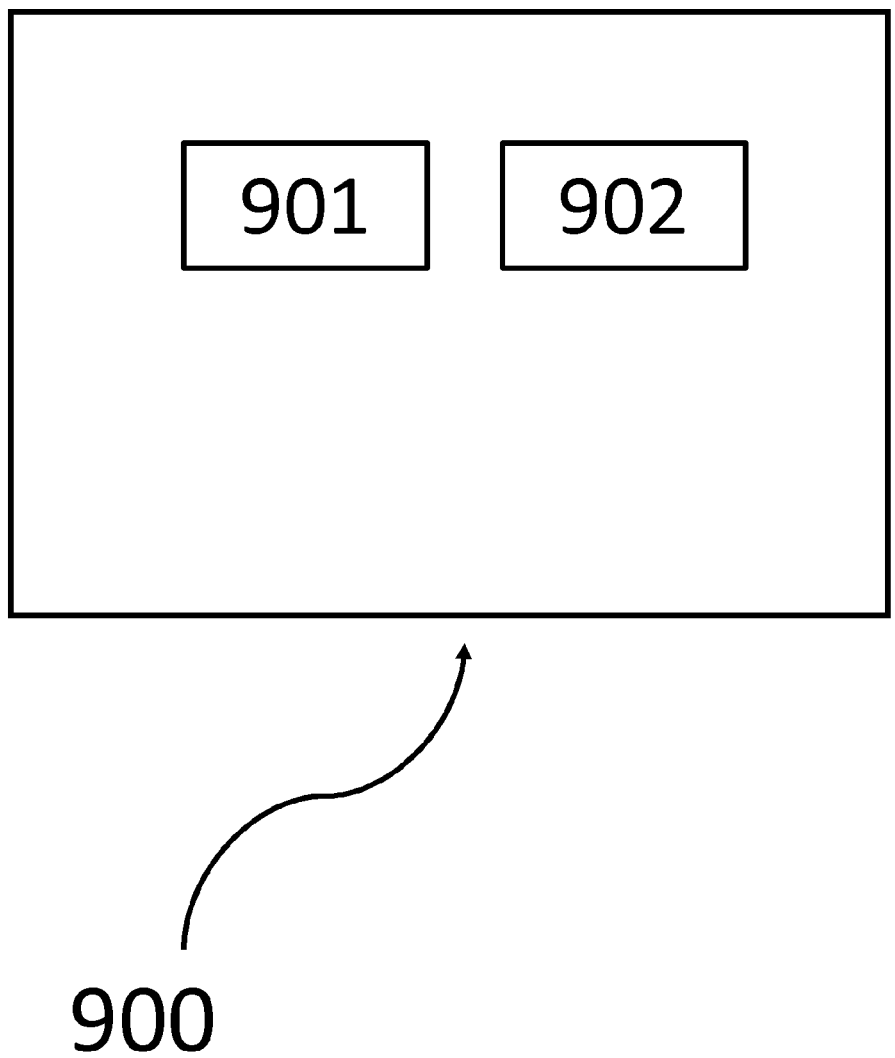
FIG. 9 shows an embodiment of an apparatus for determining a physical property related to a charge of a constituent of a sample, from field flow fractionation measurements with an additional electrical field, comprising: a processor and a memory, said memory containing instructions executable by said processor.

FIG. 9 shows an embodiment of an apparatus 900 for determining a physical property related to a charge of a constituent of a sample, from field flow fractionation measurements with an additional electrical field, comprising: a processor 901 and a memory 902, said memory containing instructions executable by said processor, whereby said processor is operative to:
 obtain a first fractogram of a first sample and a second fractogram of a second sample, wherein the first sample and the second sample are samples of a same substance, the first fractogram has been generated using a first electrical field, the second fractogram has been generated using a second electrical field, and a strength of the first electrical field and a strength of the second electrical field are different from each other;
 determine, by using a first mapping, from a first intensity value of the first fractogram, a first value and determine, by using a second mapping, from a second intensity value of the second fractogram, a second value; and
 determine, based on the first value and the second value, a physical property related to a charge of a constituent of at least one of the first sample and the second sample;

wherein the first mapping maps the first intensity value to the first value of a first bijective function over time and the second mapping maps the second intensity value to the second value of a second bijective function over time.

The apparatus may be further configured to carry any of the method steps and definitions discussed above. Specifically, the memory may be configured to store corresponding instructions whereby said network is operation to perform these steps.

Here, the processor may be any hardware component configured to process data by performing logical operations or mathematical operations. For instance, the processor may be a central processing unit, CPU, of a computer.

Moreover, the memory may be any hardware component configured to store data and instruction sets required by a processor to perform said operations. For instance, the memory may be a cache, a hard disk drive or solid state drive.

Figure 10:
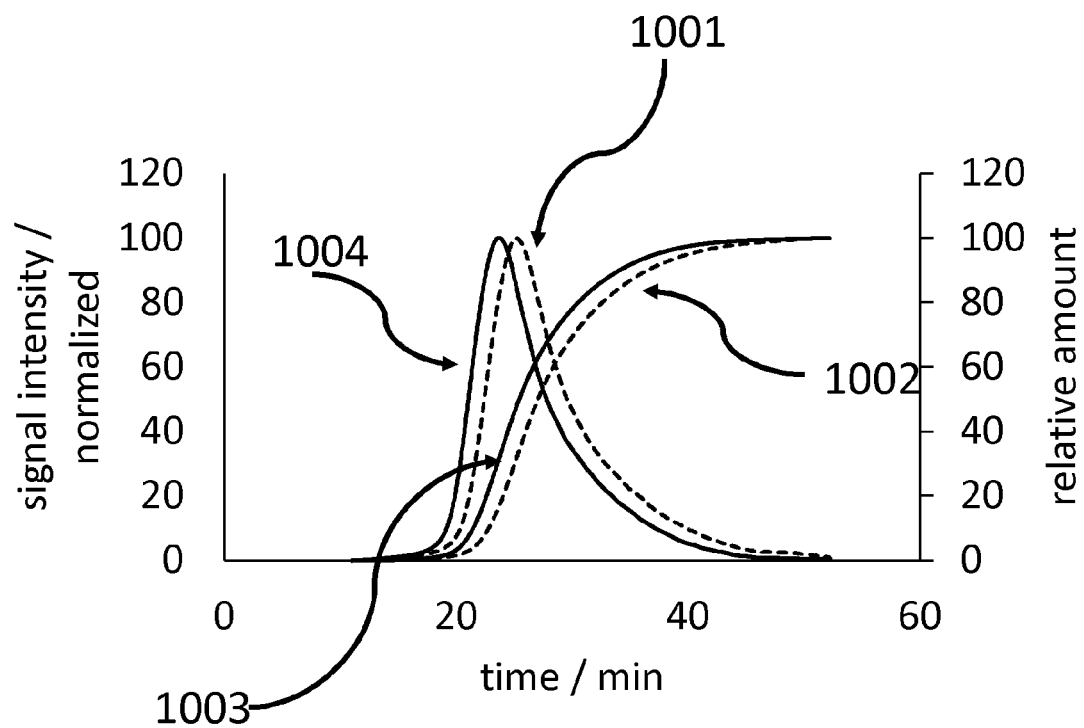
FIG. 10 illustrates a further example of the concept of the discussed method.

FIG. 10 further illustrates a non-limiting example of the concept of the method. Here, a first fractogram 1004 and a second fractogram 1001 are shown alongside a first cumulative distribution function 1003, which corresponds to the first fractogram 1004, and a second cumulative distribution function 1002, which corresponds to the second fractogram 1001. The respective cumulative distribution functions may be derived from the respective fractograms in the manner discussed above.

Figure 11:
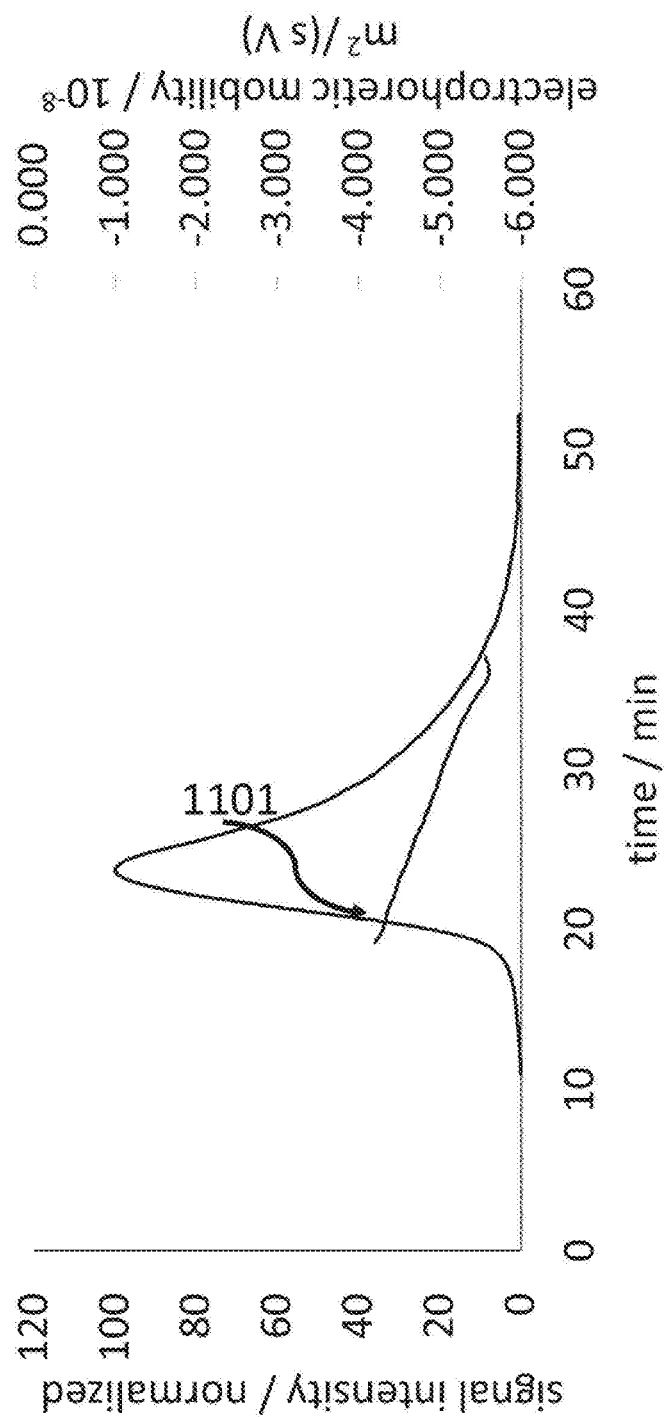
FIG. 11 shows a further example of an application of the discussed method, where a distribution of electrophoretic mobilities, which has been obtained in the manner discussed above, is plotted over the time-axis of a fractogram.

FIG. 11 further provides a non-limiting example of an application of the method discussed herein, where a distribution of electrophoretic mobilities 1101, which has been obtained in the manner discussed above, is plotted for several time-instances (over time interval) of a fractogram.

The following sections provide further useful, non-limiting information and non-limiting examples about the method and apparatus as discussed above.

A method for determining continuous surface charge distributions of suspended nanoparticles using field flow fractionation measurements is disclosed. Based on shifted fractograms induced by an electrical field, the electrophoretic mobility can directly be evaluated. Only one detector signal subsequent to the fractionation is necessary for the said method, whereby the signal can be based upon any kind of detector, e.g. MALS, dRI, UV/Vis, ICP-MS or viscometric detectors. The present method may be able to determine electrophoretic mobility values across the complete size distribution, which results in a continuous electrophoretic mobility distribution. Additionally, the electrophoretic mobility distribution can be converted into a zeta potential distribution and a net charge distribution, respectively. Furthermore, FFF theory can be used to determine hydrodynamic sizes from obtained retention times, giving the possibility to overlay the charge distribution directly to size information. In general, the methods extreme stability and generality allow it to a broad application range. Consequently, the method is not limited to electrical asymmetrical flow field flow fractionation measurements (EAF4) and can also be applied to other FFF sub-techniques.

The physico-chemical characterization of nanomaterials is one of the key steps in the development process towards a reliable and optimized production. Important measurands of physico-chemical characterization are among others particle size, particle morphology, particle concentration, stability, homogeneity, composition and surface charge. The surface charge is an important parameter to predict the stability of nanomaterials in solution but also to study the interactions of particles with each other and more importantly with other components. Furthermore, physico-chemical properties are also essential information for toxicological assessments.

With the corona pandemic nanomedicine and vaccine research became the focus of attention. Separation technologies like asymmetrical flow field-flow fractionation (AF4) hyphenated with multiple detectors offer the potential to comprehensively analyze complex and also polydisperse samples. Moreover, multi-detector characterization provides a time-saving, effective and efficient data collection. Especially, against the background of valuable user and analysis time within the pharmaceutical industry.

Field-flow fractionation (FFF) comprises a family of elution-based separation techniques. One sub-technique of FFF is AF4, which is capable of a rapid and high efficient separation of suspended and dissolved samples in a size range of 1 nm up to several micrometers. In AF4, the separation is achieved in a narrow, ribbon-like channel with a semipermeable membrane at the channel bottom (accumulation wall). Due to the laminar flow along the channel axis a parabolic flow profile is generated across the channel height. Perpendicular to the channel flow, a second flow (cross flow) is applied thereby inducing the separation of sample constituents by their diffusion coefficient and size, respectively. The Stokes-Einstein equation correlates the diffusion coefficient of suspended species with the hydrodynamic size. Another variant of AF4 is electrical AF4 (EAF4). In EAF4, an electrical field is simultaneously superimposing the cross flow field, inducing a charge dependent separation dimension. Next to the high-resolution of AF4 and EAF4, respectively, and the resulting access to particle size distribution and surface charge of a respective sample constituent, the technology offers the possibility to remove matrix components smaller compared to the cut-off of the ultrafiltration membrane via the cross flow or separate matrix components from the analyte during the fractionation. As a consequence, AF4 or EAF4 are able to fractionate and/or purify highly complex as well polydisperse sample and allows subsequent characterization in one measurement. Furthermore, the advantage of a fractionation step prior to characterization might decrease the need for advanced sample preparation. AF4 and EAF4 are also able to fractionate and analyze nanomaterials in biological matrices.

As mentioned above the surface charge is one of the important properties when studying nanomaterials, their stability in solution and their interaction with other materials. The stability for instance of the mRNA-LNP corona vaccines is a critical aspect. On the other hand the surface and surface charge are also key parameters for the cellular uptake of drug delivery systems. ELS and phase analysis light scattering (PALS) are established methods to measure the electrophoretic mobility or zeta potential, respectively. Both cannot access distributions of charge in dependence of size aside from limitations for low scattering intensities. In contrast to that EAF4 is able to resolve the size distribution with the simultaneous analysis of the charge distribution. Another great advantage of EAF4 is based on its principle and geometry, because the analyte is close to the accumulation wall and therefore not influenced by electrode processes or by direct contact to the electrode due to the large distance to the electrodes.

For the analysis of the charge distribution from EAF4 measurements it is necessary to run at least two measurements with different electrical field strengths. For example one measurement with an electrical field equal to zero (reference measurement) and another measurement with the same fractionation parameters but an electrical field strength unequal to zero. Sample constituents with a non-zero net charge will be affected by the superimposed electrical field and therefore the retention time will be manipulated compared to the reference measurement as the retention time is a function of the effective electrical field strength.

The current state of the EAF4 surface charge evaluation includes the selection of the peak maximum of at least two measurements, which were performed under the influence of different electrical fields. From the ratio of the manipulated retention times the drift velocity can be calculated and in an additional step a linear regression analysis from the drift velocities in variation of the electrical field results in the electrophoretic mobility and zeta potential, respectively.

The challenge in the analysis of data from EAF4 measurements with various electrical field strengths is to follow a specific size fraction under the influence of the different electrical fields and correlate the specific retention time modulations induced by the electrical field with the electrical field strengths. For a monodisperse sample the peak maximum of a specific detector signal can be used to evaluate the electrophoretic mobility from the manipulated retention times. This approach might be meaningful for monodisperse samples with one particular size, like proteins or narrow size standards or even multimodal size mixtures with distinct peak maxima, but is not providing sufficient results for environmental, polydisperse or nanomedical samples.

Charge distributions of polydisperse samples containing a broad size range are not accessible, because only the peak maximum is a point of the fractogram, which can be bijectively identified. The present method calculates continuous charge distributions over the complete size range of the sample from field flow fractionation measurements.

The new approach uses cumulative distributions of each fractogram as a starting point of the analysis. The cumulative distribution can be constructed on the basis of any detector signal by summing up all intensity values over the complete fractogram and normalizing it to the total area. This procedure results in a functional dependency of relative amounts and elution time. This cumulative distribution is characterized by relative amounts that are correlated to a specific time point of the fractogram. By comparing all relative amount fractions from all fractograms corresponding time shifts are obtained.

The observed time shifts are a function of the applied electrical field. From these time shifts the electrophoretic mobility, the zeta potential and net charge, respectively, for each relative fraction is accessible. Additional information can be gained, when using FFF theory, EAF4 allows the retention time correlation to hydrodynamic sizes. Therefore, for each fraction representing a relative amount the hydrodynamic size can be determined. Putting both calculations, the electrophoretic mobility calculation and the hydrodynamic size analysis together a continuous charge distribution with correlating sizes can be calculated.

The method enables the universal applicability to any arbitrary detector signal. Furthermore, the herein presented method can also be applied to other FFF sub-techniques and is not restricted to EAF4.

For EAF4 experiments at least two measurements at different electrical field strengths are necessary. Firstly, a reference measurement with no electrical field (reference measurement) is performed. Keeping all fractionation parameters constant a second EAF4 measurement needs to be performed using a non-zero electrical field strength. In the case, the analyte carries a non-zero surface charge, the retention time will be manipulated as a function of the applied electrical field strength. In the final analysis the retention time shift is compared to the reference measurement with the electrical field strength of zero to calculate the drift velocity. From a regression analysis of the drift velocity in dependence of the electrical field strength the electrophoretic mobility can be determined. This can also be achieved by calculating the electrophoretic mobility contribution to corresponding theoretical retention times.

The already published method used the peak maximum to follow the retention time manipulation under the influence of a varying electrical field due to the peaks distinct position and recognizability as discussed in the prior art. In general, the EAF4 evaluation is only valid for electrical field strengths that are not skewing the peaks significantly or change the sample constituents.

The procedure of the herein presented method is able to track each fraction of the peak as a function of the electrical field. The cumulative distribution $S_n(t)$ is calculated by integrating the intensity $I_n(t)$ over time t from the fractogram n and correlating it to the total area under the intensity signal curve.

$$S_n(t) = \frac{\int_0^t I_n(t)dt}{\int_0^\infty I_n(t)dt}$$

This cumulative distribution is characterized by a functional dependency of relative amounts and elution time.

As a consequence, relative amounts with defined time points are obtained. For a multiple set of p EAF4 measurements with n=[1:p] for each measurement each time point $t_i$ with a specific relative amount $S_n(t_i)$ is related to a time point of the same relative amount fraction of the reference measurement. For example the retention time point at any relative amount x of the peak area can be related to the retention time of the reference measurement at the same relative amount x. For a continuous charge distribution the method is repeated at distinct increments. The electrophoretic mobility calculation is then performed for each relative amount.

The zeta potential can be derived by further processing the electrophoretic mobility using the Henry's Function $f(kR_h)$, permittivity in vacuum $\varepsilon_0$, relative permittivity $\varepsilon_r$ and viscosity $\eta$ of the surrounding medium.

$$\zeta = \frac{3\eta\mu_e}{2\varepsilon_0\varepsilon_r f(kR_h)} \quad (3)$$

Using the Henry's Function $f(kR_h)=1.5$ equation (3) transfers to the so-called Smoluchowski approximation and is valid for low and medium ionic strength media with the thickness of the electrical double layer significantly smaller compared to the radius of the analyte. The Henry's Function can take values from 1.0 to 1.5 and is a function of among others of the ionic strength of the surrounding medium and the temperature. The other extreme is $f(kR_h)=1.0$ and is commonly known as Hückel approximation.

Demonstration of the Method

In the following section the method will be demonstrated on sample data that were obtained by an EAF4 setup including an UV/Vis detector and MALS detector. Titanium electrodes were installed inside the separation channel, where the upper electrode was negatively charge and the lower electrode was installed below the accumulation wall. The EAF4 module controlled the constant current and monitored actual values for conductivity, pH values, voltage and current. The channel was equipped with a regenerated cellulose membrane with a molecular weight cut-off of 10 kDa and a nominal spacer height of 350 µm was placed inside a channel thermostat to keep the temperature constant at 25° C. The polydisperse sample was prepared in Borax buffer at a pH of 9 and finally diluted 1:10 prior to injection. 0.4 mM disodium carbonate at a pH=9.1 was used as a carrier solution.

The fractionation conditions consisted of a detector flow of 0.5 mL min$^{-1}$ and an initial cross flow rate with 0.5 mL min$^{-1}$. To stabilize all flow rates and to ensure a complete and stable electrical field a delay time of at least 1 min prior to injection was used. The focusing step duration was set to 5 min, with the injection of 10 µL of sample at the beginning of the focusing step. The elution consisted of a constant cross flow field for 40 min and is followed by a 12 minutes rinse step to ensure the minimization of potential memory effects.

Several measurements were performed with varying electrical field strengths. Per definition, the reference measurement has a zero electrical field. The reference measurement with a zero electrical field was compared to measurements with a constant current of 0.2 mA and 0.4 mA, which correlate to electrical fields of around −7.2 V m$^{-1}$ and around −12.2 V m$^{-1}$. Several measurements were performed to show the stability and accuracy of the algorithm and the results.

As a result, shifted fractograms, where the retention time increases with increasing electrical field strength, are obtained, see FIG. 2. Already indicating that the sample contains a measureable surface charge and the sign of the surface charge is negative due to an increasing retention time and the negative top electrode. This can be explained by a more compressed mean layer thickness above the accumulation wall and therefore a decreasing average lateral velocity.

In a first step, the data files are imported into the software. After selecting one detector trace, here MALS 90° signal, for all fractograms the identical number of peaks was automatically detected, including the setting of a baseline. The applied current and the conductivity for all fractograms are automatically extracted from the data files. The reference measurement showed a peak maximum at around 23.7 min with the peak limits from around 12 min up to 50 min. The software is determining the void time from geometrical and fractionation method information and converting the times from the fractograms into net retention times. The solvent properties can be selected from a list inside the software. The present example uses an aqueous carrier liquid, where the properties of water apply. The zeta potential evaluation model is set to the Smoluchowski approximation.

After setting the parameters for the evaluation the signals of all fractograms are normalized. The curves under the selected signal are transformed into a cumulative distribution represented by time dependent relative amounts. This step is performed for all fractograms, see FIGS. 7 and 10. Finally, for each relative amount the time points are compared to the time points of the same relative amount of the reference measurement.

In an iterative procedure the time shifts for all relative amounts in distinct increments are used to calculate electrophoretic mobilities over the complete relative amount range, which means over the complete peak and therefore complete size range of the analyte.

With the previously defined solvent properties, the electrophoretic mobility can be transformed into the respective zeta potential and net charge distribution, respectively.

Using the retention behavior of AF4 and EAF4, respectively, the time points of every relative amount can be translated into a hydrodynamic size. In conclusion, the final result is a continuous electrophoretic mobility distribution or zeta potential distribution, respectively, in dependence of the hydrodynamic size, see also FIG. 5.

LIST OF FEATURES

Transversal, flow field 101
Parabolic flow profile 102
First wall 103
First constituent 104
Second constituent 105
Second wall 106
Summation-field of transversal forces 107
Force exerted by the channel flow field 108
Additional electrical field 109
First fractogram 201
Second fractogram 202
Obtaining step 301
Determining, by using a first and second mapping, step 302
Determining a physical property step 303
First peak 401
Second peak 402
Curve representing the physical properties 501
First cumulative distribution function 701
Second cumulative distribution function 702
Obtainer 801
Determiner 802
Generator 803
Apparatus 900
Processor 901
Memory 902
Second fractogram 1001
Second cumulative distribution function 1002
First cumulative distribution function 1003
First fractogram 1004

Distribution of Electrophoretic Mobilities 1101

Now that features of the invention and some embodiments of the invention have been described, an outline (non-limiting) of various embodiments of the invention is stated as follows:

Statement 1. A method for determining a physical property related to a charge of a constituent of a sample, from field flow fractionation measurements with an additional electrical field, comprising the following steps:
obtaining a first fractogram of a first sample and a second fractogram of a second sample, wherein the first sample and the second sample are samples of a same substance, the first fractogram has been generated using a first electrical field, the second fractogram has been generated using a second electrical field, and a strength of the first electrical field and a strength of the second electrical field are different from each other;
determining, by using a first mapping, from a first intensity value of the first fractogram, a first value and
determining, by using a second mapping, from a second intensity value of the second fractogram, a second value; and
determining, based on the first value and the second value, a physical property related to a charge of a constituent of at least one of the first sample and the second sample;
wherein the first mapping maps the first intensity value to the first value of a first bijective function over time and the second mapping maps the second intensity value to the second value of a second bijective function over time.

Statement 2. The method of Statement 1, wherein the physical property related to a charge is at least one of a charge, a surface charge, an electrophoretic mobility, a zeta potential.

Statement 3. The method of Statement 2, wherein the physical property related to a charge is a distribution of at least one of a charge, an electrophoretic mobility, and a zeta potential.

Statement 4. The method of Statement 1, wherein the strength of the first electrical field is about zero, and the strength of the second electrical field is nonzero.

Statement 5. The method of Statement 1, wherein the strength of the second electrical field is within a range from −50 volts per meter to +50 volts per meter.

Statement 6. The method of Statement 1, wherein the first fractogram and the second fractogram each comprise a plurality of peaks.

Statement 7. The method of Statement 1, wherein the first and second fractogram have been obtained by at least one of electrical symmetrical flow field flow fractionation, electrical asymmetrical flow field flow fractionation, electrical centrifugal field flow fractionation, electrical thermal field flow fractionation, electrical gravitational field flow fractionation.

Statement 8. The method of Statement 1, comprising the further step of deriving at least one of a hydrodynamic radius, and a distribution of hydrodynamic radii, from at least one of the first fractogram and the second fractogram.

Statement 9. The method of Statement 1, comprising the further steps of:
generating the first fractogram by field flow fractionation measurements using the first electrical field as an additional electrical field; and
generating the second fractogram by measuring the second sample by field flow fractionation measurements using the second electrical field as an additional electrical field.

Statement 10. The method of Statement 1, wherein using the first mapping comprises obtaining the first value by integrating a plurality of intensity values of the first fractogram over a time-interval, and using the second mapping comprises obtaining the second value by integrating a plurality of intensity values of the second fractogram over a time-interval.

Statement 11. The method of Statement 1, wherein the first value is a cumulative distribution and the second value is a cumulative distribution.

Statement 12. The method of Statement 1, wherein determining, based on the first value and the second value, the physical property related to a charge of a constituent comprises computing a difference based on the first value and the second value, and determining the physical property based on the difference.

Statement 13. An apparatus for determining a physical property related to a charge of a constituent of a sample, from field flow fractionation measurements with an additional electrical field, comprising:
- an obtainer configured to obtain a first fractogram of a first sample and a second fractogram of a second sample, wherein the first sample and the second sample are samples of a same substance, the first fractogram has been generated using a first electrical field, the second fractogram has been generated using a second electrical field, and a strength of the first electrical field and a strength of the second electrical field are different from each other;
- a determiner configured to determine, by using a first mapping, from a first intensity value of the first fractogram, a first value and determining, by using a second mapping, from a second intensity value of the second fractogram, a second value; and
- configured to determine, based on the first value and the second value, a physical property related to a charge of a constituent of at least one of the first sample and the second sample;
- wherein the first mapping maps the first intensity value to the first value of a first bijective function over time and the second mapping maps the second intensity value to the second value of a second bijective function over time.

Statement 14. The method of Statement 13, wherein the physical property related to a charge is at least one of a charge, a surface charge, an electrophoretic mobility, a zeta potential, a net charge.

Statement 15. The apparatus of Statement 13, wherein using the first mapping comprises obtaining the first value by integrating a plurality of intensity values of the first fractogram over a time-interval, and using the second mapping comprises obtaining the second value by integrating a plurality of intensity values of the second fractogram over a time interval.

Statement 16. The apparatus of Statement 13, wherein the strength of the first electrical field is about zero, and the strength of the second electrical field is nonzero.

Statement 17. The apparatus of Statement 13, wherein determining, based on the first value and the second value, the physical property related to a charge of a constituent comprises computing a difference between the first value and the second value, and determining the physical property based on the difference.

Statement 18. The apparatus of Statement 13, further comprising a generator configured to generate the first fractogram by measuring the first sample by field flow fractionation measurements using the first electrical field as an additional electrical field, and to generate the second fractogram by measuring the second sample by field flow fractionation measurements using the second electrical field as an additional electrical field.

Statement 19. The apparatus of Statement 13, wherein the first and second fractogram have been obtained by at least one of electrical symmetrical flow field flow fractionation, electrical asymmetrical flow field flow fractionation, electrical centrifugal field flow fractionation, electrical thermal field flow fractionation, electrical gravitational field flow fractionation.

Statement 20. An apparatus for determining a physical property related to a charge of a constituent of a sample, from field flow fractionation measurements with an additional electrical field, comprising:
- a processor; and
- a memory, said memory containing instructions executable by said processor, whereby said processor is operative to:
  - obtain a first fractogram of a first sample and a second fractogram of a second sample, wherein the first sample and the second sample are samples of a same substance, the first fractogram has been generated using a first electrical field, the second fractogram has been generated using a second electrical field, and a strength of the first electrical field and a strength of the second electrical field are different from each other;
  - determine, by using a first mapping, from a first intensity value of the first fractogram, a first value and determine, by using a second mapping, from a second intensity value of the second fractogram, a second value; and
  - determine, based on the first value and the second value, a physical property related to a charge of a constituent of at least one of the first sample and the second sample;
- wherein the first mapping maps the first intensity value to the first value of a first bijective function over time and the second mapping maps the second intensity value to the second value of a second bijective function over time.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method for determining a physical property related to a charge of a constituent of a sample, from field flow fractionation measurements with an additional electrical field, comprising the following steps:
   - obtaining a first fractogram of a first sample and a second fractogram of a second sample, wherein the first sample and the second sample are samples of a same substance, the first fractogram has been generated using a first electrical field, the second fractogram has been generated using a second electrical field, and a strength of the first electrical field and a strength of the second electrical field are different from each other;
   - determining, by using a first mapping, from a first intensity value of the first fractogram, a first value and determining, by using a second mapping, from a second intensity value of the second fractogram, a second value; and
   - determining, based on the first value and the second value, a physical property related to a charge of a constituent of at least one of the first sample and the second sample;
   - wherein the first mapping maps the first intensity value to the first value of a first bijective function over time and the second mapping maps the second intensity value to the second value of a second bijective function over time;
   - and the physical property related to a charge is a distribution of at least one of a charge, an electrophoretic mobility, and a zeta potential, wherein the distribution comprises a plurality of data points, each data point reflecting a value of a charge, or an electrophoretic mobility, or a zeta potential;

and using the first mapping comprises obtaining the first value by integrating a plurality of intensity values of the first fractogram over a time-interval, and using the second mapping comprises obtaining the second value by integrating a plurality of intensity values of the second fractogram over a time-interval;

and determining, based on the first value and the second value, the physical property related to a charge of a constituent comprises computing a difference based on the first value and the second value, and determining the physical property based on the difference;

and the first value is a cumulative distribution, and the second value is a cumulative distribution, wherein each cumulative distribution has the property that it is non-decreasing and right-continuous, and that it comprises a data set which is bijective to a set which comprises time-instances where field flow fractionation measurement results have been obtained.

2. The method of claim 1, wherein the strength of the first electrical field is about zero, and the strength of the second electrical field is nonzero.

3. The method of claim 1, wherein the strength of the second electrical field is within a range from −50 volts per meter to +50 volts per meter.

4. The method of claim 1, wherein the first fractogram and the second fractogram each comprise a plurality of peaks.

5. The method of claim 1, wherein the first and second fractogram have been obtained by at least one of electrical symmetrical flow field flow fractionation, electrical asymmetrical flow field flow fractionation, electrical centrifugal field flow fractionation, electrical thermal field flow fractionation, electrical gravitational field flow fractionation.

6. The method of claim 1, comprising the further step of deriving at least one of a hydrodynamic radius, and a distribution of hydrodynamic radii, from at least one of the first fractogram and the second fractogram.

7. The method of claim 1, comprising the further steps of:
generating the first fractogram by field flow fractionation measurements using the first electrical field as an additional electrical field; and
generating the second fractogram by measuring the second sample by field flow fractionation measurements using the second electrical field as an additional electrical field.

8. An apparatus for determining a physical property related to a charge of a constituent of a sample, from field flow fractionation measurements with an additional electrical field, comprising:
an obtainer configured to obtain a first fractogram of a first sample and a second fractogram of a second sample, wherein the first sample and the second sample are samples of a same substance, the first fractogram has been generated using a first electrical field, the second fractogram has been generated using a second electrical field, and a strength of the first electrical field and a strength of the second electrical field are different from each other;
a determiner configured to determine, by using a first mapping, from a first intensity value of the first fractogram, a first value and determining, by using a second mapping, from a second intensity value of the second fractogram, a second value; and
configured to determine, based on the first value and the second value, a physical property related to a charge of a constituent of at least one of the first sample and the second sample;

wherein the first mapping maps the first intensity value to the first value of a first bijective function over time and the second mapping maps the second intensity value to the second value of a second bijective function over time;

and the physical property related to a charge is a distribution of at least one of a charge, an electrophoretic mobility, and a zeta potential, wherein the distribution comprises a plurality of data points, each data point reflecting a value of a charge, or an electrophoretic mobility, or a zeta potential;

and using the first mapping comprises obtaining the first value by integrating a plurality of intensity values of the first fractogram over a time-interval, and using the second mapping comprises obtaining the second value by integrating a plurality of intensity values of the second fractogram over a time interval;

and determining, based on the first value and the second value, the physical property related to a charge of a constituent comprises computing a difference between the first value and the second value, and determining the physical property based on the difference;

and the first value is a cumulative distribution, and the second value is a cumulative distribution, wherein each cumulative distribution has the property that it is non-decreasing and right-continuous, and that it comprises a data set which is bijective to a set which comprises time-instances where field flow fractionation measurement results have been obtained.

9. The apparatus of claim 8, wherein the strength of the first electrical field is about zero, and the strength of the second electrical field is nonzero.

10. The apparatus of claim 8, further comprising a generator configured to generate the first fractogram by measuring the first sample by field flow fractionation measurements using the first electrical field as an additional electrical field, and to generate the second fractogram by measuring the second sample by field flow fractionation measurements using the second electrical field as an additional electrical field.

11. The apparatus of claim 8, wherein the first and second fractogram have been obtained by at least one of electrical symmetrical flow field flow fractionation, electrical asymmetrical flow field flow fractionation, electrical centrifugal field flow fractionation, electrical thermal field flow fractionation, electrical gravitational field flow fractionation.

12. An apparatus for determining a physical property related to a charge of a constituent of a sample, from field flow fractionation measurements with an additional electrical field, comprising:
a processor; and
a memory, said memory containing instructions executable by said processor, whereby said processor is operative to:
obtain a first fractogram of a first sample and a second fractogram of a second sample, wherein the first sample and the second sample are samples of a same substance, the first fractogram has been generated using a first electrical field, the second fractogram has been generated using a second electrical field, and a strength of the first electrical field and a strength of the second electrical field are different from each other;
determine, by using a first mapping, from a first intensity value of the first fractogram, a first value and determine, by using a second mapping, from a second intensity value of the second fractogram, a second value; and determine, based on the first value and the second value, a physical property related to a charge of a constituent of at least one of the first sample and the second sample;

wherein the first mapping maps the first intensity value to the first value of a first bijective function over time and the second mapping maps the second intensity value to the second value of a second bijective function over time;

and the physical property related to a charge is a distribution of at least one of a charge, an electrophoretic mobility, and a zeta potential, wherein the distribution comprises a plurality of data points, each data point reflecting a value of a charge, or an electrophoretic mobility, or a zeta potential;

and using the first mapping comprises obtaining the first value by integrating a plurality of intensity values of the first fractogram over a time-interval, and using the second mapping comprises obtaining the second value by integrating a plurality of intensity values of the second fractogram over a time-interval;

and determining, based on the first value and the second value, the physical property related to a charge of a constituent comprises computing a difference based on the first value and the second value, and determining the physical property based on the difference;

and the first value is a cumulative distribution, and the second value is a cumulative distribution, wherein each cumulative distribution has the property that it is non-decreasing and right-continuous, and that it comprises a data set which is bijective to a set which comprises time-instances where field flow fractionation measurement results have been obtained.

\* \* \* \* \*